Dec. 1, 1964   J. R. COX, JR   3,159,832
ANTI-COLLISION DEVICE FOR AIRCRAFT
Filed Sept. 19, 1958   4 Sheets-Sheet 1

INVENTOR.
JEROME R. COX, JR.
BY
*Jerome R. Cox*
ATTORNEY

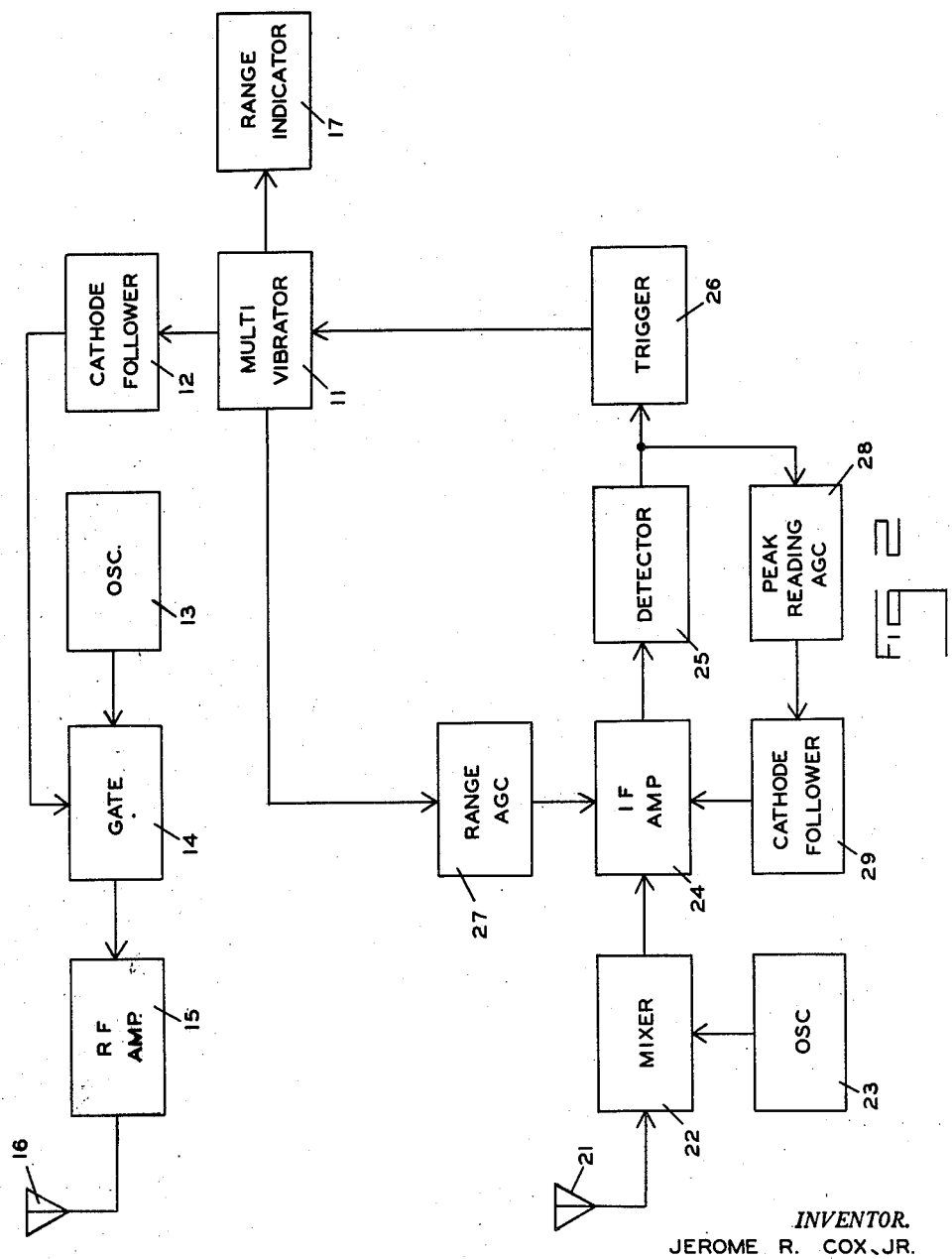

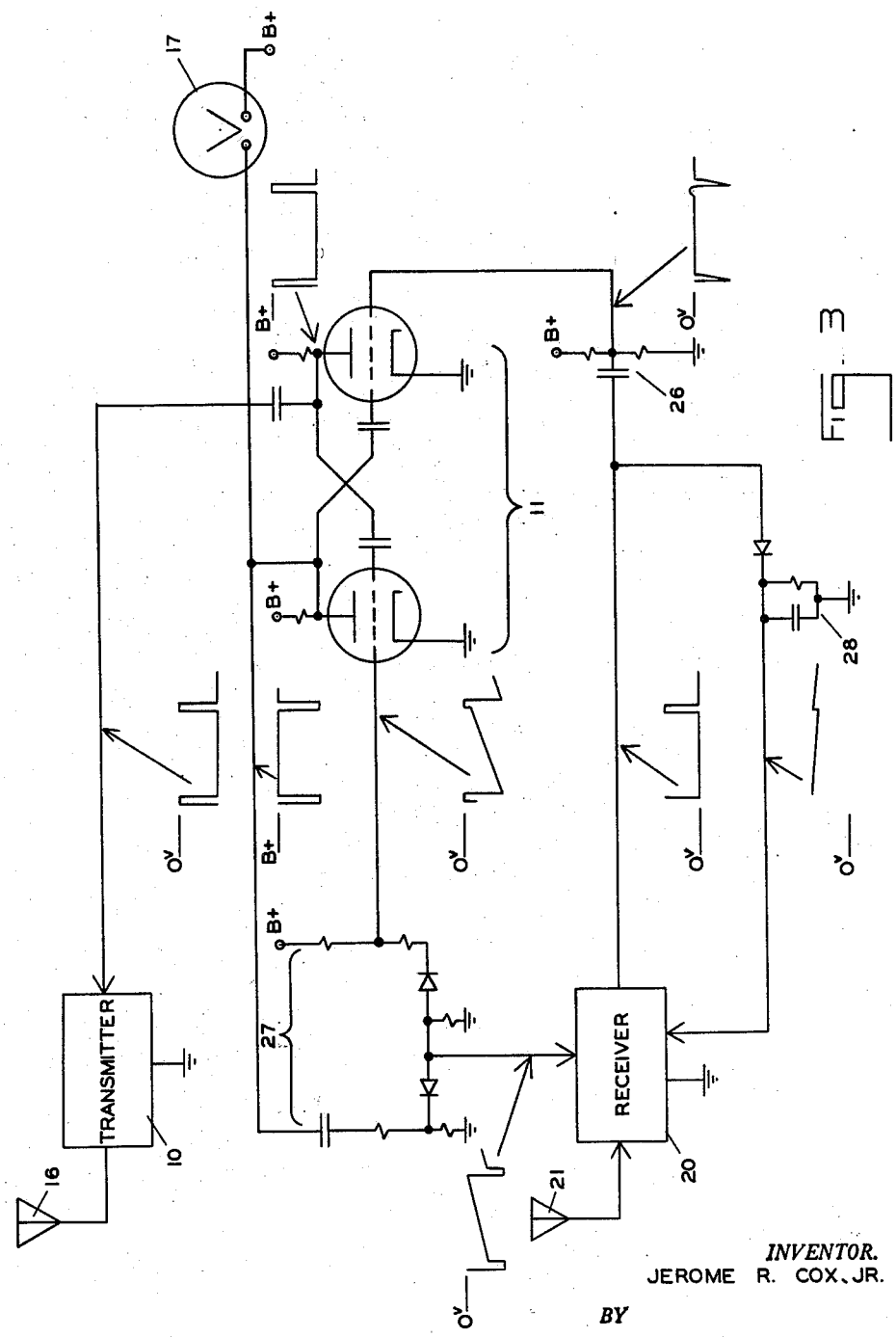

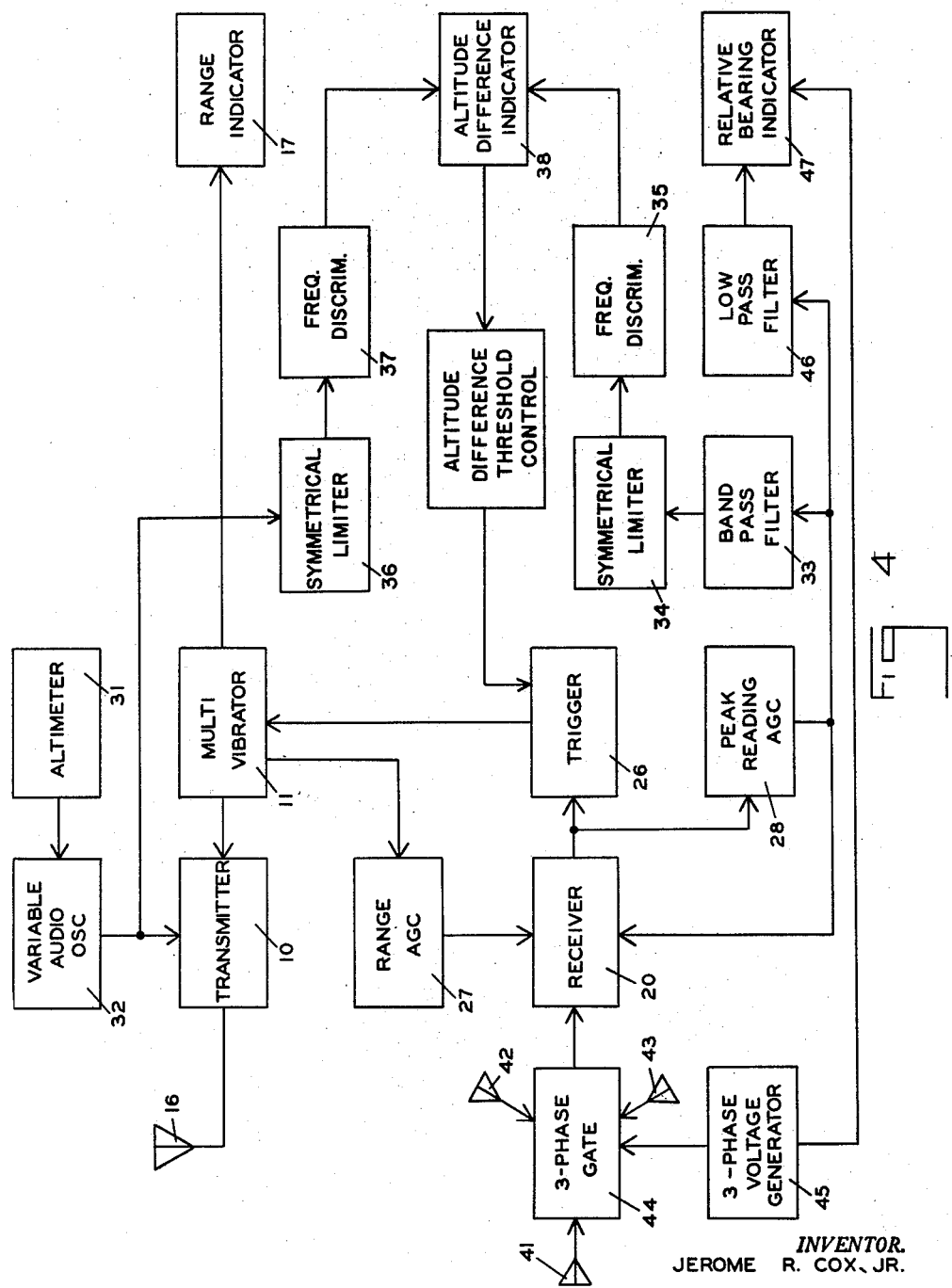

United States Patent Office 3,159,832
Patented Dec. 1, 1964

3,159,832
ANTI-COLLISION DEVICE FOR AIRCRAFT
Jerome R. Cox, Jr., Kirkwood, Mo.
(415 Wickworth Lane, Sunset Hills, Mo.)
Filed Sept. 19, 1958, Ser. No. 761,984
12 Claims. (Cl. 343—7.5)

The invention disclosed and claimed in this application relate to instruments for aircraft and to methods of warning aircraft against dangers of collision, and the embodiments of my invention disclosed in this application consist of pulse-return radio systems designed specifically for the prevention of mid-air aircraft collisions.

*Problems Involved*

One of the most serious problems facing the world of aviation today is the ever-increasing number of aircraft collisions, not only in regions of high traffic density, but also in areas remote from large traffic control centers. At this time, no one questions the need for a universal anti-collision device.

The importance of equipping all aircraft with a universal anti-collision device is becoming more evident almost daily. A major obstacle to the attainment of such a goal, however, is the fact that the largest number of aircraft in use today are privately owned. The cost of a highly complex collision warning device would be prohibitive to many owners. Conversely, a relatively simple device such as a radar beacon in each craft would not give the small owner any indication of impending danger. It would probably protect him, it is true, from collision with the owner of a highly complex system, but would not protect him from collision with other aircraft equipped only like himself with a beacon device.

Even if every craft could be equipped with a complex collision warning computer, such a device would be of questionable value in regions of high traffic density simply because flight path organization in such a situation requires the leadership of a control center which most feasibly is located at the nearby air terminal. Thus the chief use of a practical collision warning system is in regions where aircraft density is moderate or low. An anti-collision device should nevertheless be capable, as mine is, of being integrated with the leadership of such control centers. A further general requirement of a satisfactory collision warning system is that it be usable in any part of the world, regardless of terrain. Any system which gains world-wide acceptance must, of necessity, be simple, economical and highly reliable.

A satisfactory collision warning device must provide continuous surveillance under all flight conditions. Warning must be early enough to permit the pilot to take suitable evasive action calmly. Warning must be automatic, requiring no attention from the pilot under normal flight, but must attract his attention as soon as danger impends. The occurrence of false alarms must be held to a minimum.

Information regarding the range and altitude and relative azimuth bearing of the other aircraft should be presented to the pilot in a simple form.

A universally acceptable collision warning device must be built so that it can be operated independently from other equipment in the airplane.

Other desirable features of a collision warning device are reliability, simplicity, ease of maintenance, and a self-checking capability.

The speed of the jet age has made obsolete the "see and be seen" principle which has been the heart of air traffic control since it was established by the Civil Aeronautics Act of 1938. Air safety experts say that human reactions have fallen behind the speed of the jet age. When two planes are approaching each other at 600 miles per hour, even if one pilot sees the other aircraft a mile away he may hit it before he can make a move to avert the collision.

Unless all aircraft in the air are required by regulation to be equipped, there is a high likelihood that most aircraft will not be equipped. Even if only a few aircraft are not equipped, there will be a significant probability of collisions and resulting disasters. Complicated systems might be designed that would work, but such complicated systems would be too expensive, heavy, complicated and resultingly unreliable. It would seem unreasonable to require such complicated systems on all aircraft. It is therefore highly desirable that there be devised a simple, relatively inexpensive, light-weight system for informing a pilot of an airplane when there is another airplane in the same vicinity.

*Prior Art*

During World War II and since, radar beacons have been used extensively in aircraft navigation and otherwise. As is well known, a true radar set operates by sending out powerful pulses of radio waves and then receiving the portions of energy that are reflected to it. The elapsed time between the emission of a pulse and the return of an echo is a measure of the distance of the reflecting target. The radar beacon is a device that upon reception of the original radar pulses, triggers its own transmitter to give a strong reply independent of possible radar echoes in the vicinity. It may be said to be an amplifier of the echo. It is quiescent without external stimulation from a radar. When a radar transmits a signal that is received by a beacon, the radar is said to be "interrogating the beacon." The radar is therefore called an interrogator. Radar beacons have been called variously beacons, transponders, responder beacons and racons. The greatest use of radar beacons during the war was for IFF (identification friend or foe). They were also used extensively in locating targets for bombing missions. Aircraft equipped with interrogators may determine their position from one or more ground stations with beacons at known positions. Air to surface beacon systems (interrogator on aircraft, beacon on surface) are used mainly for navigation. The principal use of surface to air systems is to aid in the surveillance, identification, and control of large numbers of aircraft from a fixed station on the surface of the earth or from a ship. To identify the particular aircraft, the response of the beacon on each aircraft included a coded identification. It has even been suggested that radar beacons may be provided for collision warning. However, so far as I know, no such prior suggested use of radar beacons has ever been tried, nor has it ever been heretofore proposed that a single device shall serve simultaneously as an interrogator and a responder to determine range. In all prior installations for range determination of which I am aware and in all such proposals of which I know, one device is an interrogating radar and the other is a responding beacon. Moreover, the interrogator responder sequence in such prior art uses always heretofore terminates with the reception by the interrogator of the response. In such prior uses, another interrogation may be immediately initiated but it is a separate sequence and it is not a continuous process. Moreover, in such prior uses the process is always asymmetrical and it is always under the control of the interrogator. It is never, in such prior art use, under joint control of both aircraft who are each simultaneously interrogating the other in a continuous process. Unlike these prior art processes, my process is a continuous process which does not end with the reception of the response and then start again with another interrogation, but includes continuous interrogations and responses by both aircraft.

Objects

One of the objects of my invention therefore is the provision of a simple, relatively inexpensive, and relatively lightweight device for notifying the pilot of each aircraft when some other aircraft is in the vicinity.

A further object of my invention is the provision of such a device capable of notifying the pilot of the distance of another aircraft in the vicinity.

A further object of my invention is the provision in combination with such a system of additional means for notifying the pilot when another aircraft in the vicinity is at a similar altitude or of notifying him of the altitude of such other craft or of the differences in altitude between the two aircraft.

A further object of the invention is the provision in combination with such a system of means for notifying the pilot of an aircraft of the bearing of a second aircraft in the vicinity relative to the flight direction of the first aircraft.

Further objects and features of my invention will be apparent from this specification and claims when considered in connection with the accompanying drawings.

Drawings

In the drawings I have shown several embodiments of my invention.

In said drawings:

FIG. 2 is a block diagram of an electronic system for indicating to the pilot of an aircraft, on which the system is installed, the range (i.e. distance in miles) of another aircraft in the same vicinity having a similar electronic system installed thereon;

Figure 1:
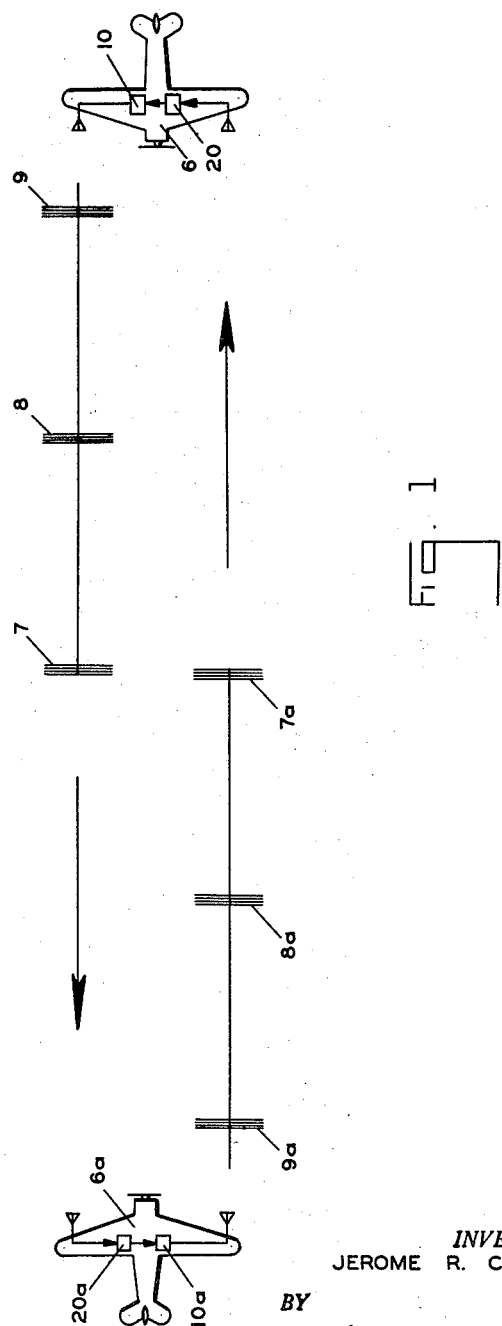
FIG. 1 shows two airplanes transponding with each other.

FIG. 3 is an electrical diagram showing further possible details of the system shown in FIG. 2, but with some elements such as the receiver and transmitter circuits not being shown in detail because they are conventional circuits; and FIG. 4 is a diagram similar to FIG. 2 having the equipment shown in FIG. 2, but having in addition, electronic equipment capable of indicating the difference in altitude between the two aircraft and capable of indicating the bearing of the second aircraft relative to that of the aircraft in which the system has been installed.

The cathode followers shown in FIG. 2 are conventional elements not absolutely necessary to the operation and have been omitted from FIG. 3 and FIG. 4 for clarity and simplicity.

General Description

One of the main purposes of my invention is to warn aircraft of the presence of nearby aircraft and of the distance (or range), direction, and altitude of such nearby aircraft. Where a plurality of aircraft in the same vicinity are equipped with devices according to my invention, they transpond with each other as indicated in FIG. 1 and thus warn each other of their presence, distance, etc. As stated above, it is highly desirable for the complete success of my system, that it shall be used universally on all aircraft in the air. To the end that there may be safety against collisions, I hope that the system will be so used as universally as may be practical.

Therefore in a relatively broad aspect, my system consists of an electronic device or pulse-return radio system (P.R.R.S.) one of which shall be mounted on each aircraft and each of which systems or devices shall include (1) a radio transmitter at times transmitting pulses with a prescribed carrier frequency; (2) a radio receiver; (3) a trigger device capable of causing the transmitter to transmit pulses substantially immediately after the recognition of a valid pulse signal whereby the transmitter will transmit pulses more frequently than it would without such excitation; and (4) a device for giving a measure of the repetition rate of pulses received and/or sent. Two aircraft such as 6 and 6a so equipped when approaching each other will pass pulses back and forth between the electronic devices (P.R.R.S.) as indicated in FIG. 1. The period of this train of pulses adjusted for the delays in recognition and retransmission by the devices on both aircraft and divided by eleven micro-seconds gives the approximate range in miles. A simple average reading voltmeter will give a reading inversely proportional to the range and is calibrated to indicate to the respective pilots the distance in miles or otherwise between the two aircraft.

Detailed Description

Referring now in detail to the drawings, it may be seen that I have shown schematically in FIG. 1 an airplane 6 transponding with an airplane 6a. Each of these airplanes has equipment constructed according to my invention so that they can transpond with each other. The transmitter 10 in one of the airplanes (i.e. airplane 6) transmits a radio pulse 7 which is later received by the receiver 20a in the other airplane (i.e. airplane 6a). The transmitter 10a of airplane 6a is triggered to send a new pulse 7a back to the receiver 20 in airplane 6. The transmitter 10 in airplane 6 is in turn triggered to send another new pulse 8 back to airplane 6a. This continues with the transmitters on the airplanes sending out in turn pulses 8a, 9 and 9a, etc. The sequence continues as described above, so long as the airplanes are within range of each other. In FIG. 1 the successive pulses 7, 8 and 9, and 7a, 8a and 9a are shown as if beamed directly at the other airplane but actually they are sent out by each antenna in all directions. While there are six pulses shown in FIG. 1, this is merely for the purpose of explanation. Actually there is never more than one pulse in the air between the two aircraft at one time. For example, pulse 7 has already reached aircraft 6a before pulse 7a is transmitted and pulse 7a has already reached aircraft 6 before pulse 8 is transmitted, etc.

In FIG. 2 the transmitter generally designated 10 is arranged for normally transmitting pulses (which may be at a regular rate or otherwise as desired, and with a prescribed carrier frequency) outward from the aircraft with equal strength in all directions. This radio transmitter 10 is controlled by a multivibrator 11 (shown in detail in FIG. 3) of conventional design and in one simple embodiment having a free period of about 200 microseconds. The transmitter 10 may be a very high frequency (V.H.F.) transmitter. It consists of elements 13, 14 and 15 which are specifically described below. The power of the transmitter is such that the signal can be detected above any interference up to a range of approximately 18 miles. The oscillator 13 is crystal controlled and of conventional design. The gate 14 may be a conventional gate circuit or may be merely a bias applied to the oscillator tube. In either case, the signal from the oscillator 13 is passed on to the radio frequency amplifier 15 only when a pulse is received from the multivibrator 11. A cathode follower 12 may be interposed here if the multivibrator 11 is not able to drive the gate 14 directly. The radio-frequency amplifier 15 is of conventional design with sufficient bandwidth to pass the radio-frequency pulse generated by the combination of the oscillator 13 and the gate 14. The transmitting antenna 16 has an omnidirectional pattern and is of conventional design. It may be, if desired, the same antenna as the antenna 21 used as both a receiving and transmitting antenna.

Whenever a second aircraft having a similar pulse-return radio system comes within range of the device, said second aircraft receives the signal transmitted from the antenna 16, amplifies it, recognizes it, and emits a pulse in response thereto. The receiver 20 consists of elements 22, 23, 24 and 25 which are described in detail below. Thus the signal from the second aircraft is received by the receiving antenna 21 which is of conventional design and has an omni-directional pattern. The mixer 22 is a conventional heterodyne circuit which mixes the signal from the receiving antenna 21 and the signal from a crystal controlled local oscillator 23 which is of conventional design. The output of the mixer 22 is fed to a conventional intermediate-frequency amplifier 24 with a bandwidth of about one megacycle. The detector 25 is a conventional detector circuit and includes a low pass filter with a half-power point at about one megacycle to eliminate carrier frequency. In the trigger circuit 26, the output of the detector 25 is first differentiated. Whenever a pulse of sufficiently great offgoing rate of change occurs, the trigger circuit 26 switches momentarily from its stable state to a state that triggers the multivibrator 11. If the amplitude of the signal from the detector 25 is sufficiently great the differentiated signal may be used directly to trigger the multivibrator 11 (the circuit of FIG. 3 employs this simplification). The triggering of the multivibrator 11 causes the transmitter to emit a pulse before the normal time.

Ground reflection will not give a sufficiently great offgoing rate of change to operate the trigger circuit 26 and the multivibrator 11 even when the peak amplitude of a ground reflection is the same or somewhat greater than the peak amplitude received from another aircraft. Therefore ground reflection will, under all but the most severe conditions, be ignored.

I provide means 17 to provide a visual or aural signal to the pilot of the aircraft, indicating the near presence of another aircraft and the actual distance thereof. The visual means may be a conventional instrument such as a voltmeter which as a result of the inertia of the movement indicates the average value of the series of pulses. In FIG. 3 I have shown a voltmeter 17 which is graduated in miles to show the distance between the second aircraft and the aircraft having the equipment here explained. The aural means of indicating range may be a conventional divider circuit connected to the output of the multivibrator. This circuit would emit one pulse after a fixed number of input pulses. The number of input pulses required to produce an output pulse could be between 50 and 100. The repetition rate of the output pulses would be in the frequency range that would be clearly audible by means of a pair of earphones. The higher the pitch of the signal the nearer would be the second aircraft.

I provide means to insure that the signal at the input to the trigger circuit 26 is of the proper amplitude and to minimize false triggering. This means comprises a range compensating AGC (automatic gain control). This range AGC I have designated 27. A signal proportional to range is derived from the multivibrator 11 by means of the range AGC 27 and applied to the IF amplifier 24. This range AGC changes the amplification in a manner approximately proportional to the distance of the other aircraft. Thus planes at either maximum range or minimum range and in between will produce signals whose peak level would be about the same at the input of the trigger 26. The range AGC 27 may have a circuit such as that which is shown in FIG. 3. In this circuit an additional negative pulse from the multivibrator 11 passes through the range AGC 27 to blank the IF amplifier 24 during the transmission interval.

In addition to the range AGC, I provide means for compensating for fading (i.e. relatively slow changes in the amplitude of the received signal caused by irregularities in atmospheric propogation). A circuit for performing this function is a peak reading AGC 28 and a cathode follower 29. The peak reading AGC 28 is shown in detail in FIG. 3. It consists of a diode charging a parallel resistor and capacitor having a time constant of about 2 milli-seconds. The cathode follower circuit 29 in FIG. 2 may be needed to isolate the peak reading AGC 28 from the IF amplifier 24 preventing too rapid discharge of the capacitor. Since the device 28 reads the peak voltage output of the detector 25, it is influenced only by pulses transmitted by other nearby planes. An average reading circuit would take into account ground reflections and other noise and adjust the gain of the IF amplifier 24 improperly.

In FIG. 3 the trigger circuit 26 comprises a condenser and a resistance voltage divider at the input of the multivibrator 11. The range indicating meter 17 is in parallel with the plate resistor of one of the multivibrator triodes. The gate signal controls the transmitter 10 through a coupling capacitor connected to the grid of the oscillator tube. The negative bias on this tube is removed by the gate whenever a pulse is to be sent. The range compensating AGC circuit 27 consists of a resistor network and a pair of semiconductor diodes.

I also provide means for warning concerning the altitude of other aircraft in the vicinity. This may take the form of one or more of the following:

(1) a device for indicating the direction (including directions up and down) of a second aircraft, so that altitude differences can be recognized;

(2) A device for indicating the altitude of a second aircraft in the vicinity with which the first aircraft is transponding in combination with compatible means for indicating the altitude of the first aircraft itself;

(3) a device for indicating the differences in altitude between said second aircraft with which the first aircraft is transponding and said first aircraft;

(4) A device that causes the aircraft to transpond only with other aircraft in the vicinity between selected altitude limits.

I provide one or more of the above means for warning concerning the altitude of adjacent aircraft in combination with the above described means for indicating the range or distance between the adjacent aircraft. For example, I show in FIG. 4 means for measuring the difference in altitude between the plane on which the device of FIG. 4 is mounted and a similar plane within range having a similar device mounted thereon.

I also prefer to provide means to give information regarding the bearing of the second plane relative to the direction of travel of the plane on which the system is mounted. An example of this means is shown in FIG. 4.

The means for warning concerning the altitude of other aircraft in the vicinity depend in several embodiments on the coding of the pulses emitted by each aircraft, the coding being controlled by the altitude. This coding may be by:

(1) Carrier frequency (or frequencies) of each pulse;
(2) Number of pulses per signal;
(3) Pulse spacing;
(4) Pulse shape (including duration);
(5) Pulse repetition rate; and
(6) Amplitude modulation of pulses.

Of these, I consider pulse spacing, amplitude modulation, and carrier frequency coding as most practical. For the purpose of illustration only, I have shown in FIG. 4 one embodiment in which I amplitude-modulate the series of pulses emitted with a sine wave whose frequency depends on the altitude. It is to be understood that this is illustrative only and any of the above methods of coding the pulses may be utilized as well as directional means for indicating the direction up or down of the second aircraft.

Thus as shown in FIG. 4, a pressure sensing device 31 (as for example, an altimeter) in the aircraft, causes a low frequency variable oscillator 32 to produce a sine wave whose frequency is proportional to altitude measured from sea level. (The oscillator 32 may be of the beat-frequency type so that a small change in capacitance will shift the output frequency throughout the range of operation. A pressure-sensitive capacitive transducer is for example, used to provide the small changes in capacitance dependent upon altitude that would be required of the altimeter 31 in this example.) The frequency of the oscillator 32 is for example, chosen in such a way that the low frequency output increases one cycle per second for an increment in an altitude of ten feet (i.e. 2 kilocycles–20,000 feet). The output from this oscillator modulates the transmitter by means of a conventional audio frequency modulator. This audio frequency signal appears at the output of the peak reading AGC 28 in any aircraft within a range of eighteen miles. The frequency of this signal is compared with that indicating the altitude of the second aircraft from the second plane's variable oscillator 32. By measuring the frequency difference it is possible to have a measure of the difference in altitude between the two planes. The frequency difference is measured by the circuits 33 through 38. A band pass filter 33, of conventional design, passing frequencies between about 30 cycles per second and 3 kilocycles per second, eliminates low frequency components caused by changes in atmospheric propagation and the system for obtaining information on the relative bearing of the other aircraft. This filter 33 also eliminates sudden high-frequency transients that may occur when two planes start transponding. The output of the filter 33 will be a sine wave whose frequency is proportional to the altitude of the other plane. The amplitude of the sine wave may, however, fluctuate slowly. This effect is eliminated by the symmetrical limiter 34 of conventional design which clips off the tops and bottoms of the sine wave. Thus, only information relative to the zero crossings of the original wave is presented to the frequency discriminator 35. This device is conventional and produces a D.C. output whose amplitude is inversely proportional to the input frequency and, therefore, the other plane's altitude. Similar circuits 36 and 37 operating on the output of the audio oscillator 32 produce a D.C. output inversely proportional to the plane's own altitude. The difference between the outputs of the two frequency-discriminators is proportional to the difference in altitude of the two planes and can be read directly on a voltmeter 38. This instrument can be calibrated to read directly the number of feet separating the altitudes of the two planes.

In another embodiment of my invention I utilize a double pulse to determine altitudes of other aircraft and differences in altitudes. Instead of sending a single pulse I send a pair of pulses wherein the time interval between the pulses is controlled by the altitude. In order to do this I send the first pulse by means of a multivibrator similar to 11. This pulse triggers a delay multivibrator whose delay is set by an altimeter. This delay multivibrator triggers the sending of the second pulse of the pair. The second aircraft receives the signal from the first and amplifies it and detects it in a conventional receiver circuit. A pulse pair of the proper separation triggers the transmitter of the second aircraft in a manner similar to that described in connection with FIG. 2. Both (1) the time interval between the pair of pulses sent by the second aircraft and (2) the trigger apparatus on the first are set by the altimeters of the two planes, respectively, so that either aircraft can transpond only with aircraft at or near the same altitude. Pulse pairs with different separations are ignored. Thus any indication of an aircraft in the vicinity is an indication of a possible threat. Alternatively if desired each aircraft could detect the pair of pulses received from the other aircraft no matter what is the pulse separation and have its transmitter triggered thereby. By analysis of the separation period of the pulses received from the other aircraft, each aircraft could determine the altitude of the other aircraft or the differences in altitudes. In FIG. 4, I have shown in dotted lines an "altitude difference threshold control." Such a device is operable with the system described in columns 6 and 7, beginning at column 6, line 31, and extending to column 7, line 39. However, the "altitude difference threshold control" would work best with the system described in this paragraph which is a better system for limiting transponding to aircraft of like altitude. Thus practical considerations make it more desirable that the system here described in this paragraph be used in combination with the "altitude difference threshold control."

I also provide as shown in FIG. 4 means for sensing and indicating bearing information. As an example, I show three directional antennae 41, 42 and 43. These three antennae are arranged for example at 120° with respect to each other and each has a beam width of 120°. They are gated at a gate 44 by means of a set of low frequency three-phase voltages of generator 45. The modulation of the signal produced by this low frequency switching of the antennae appears at the output of the peak reading AGC 28 and passes through a low pass filter 46 with a cut-off frequency of a few cycles per second. The relative bearing indicator 47 is for example simply an indicating needle mounted on a moving coil which is aligned in the appropriate direction by means of a rotating magnetic field derived from the set of low frequency three-phase voltages from generator 45. A more complicated but conventional, radar-type P.P.I. display may alternatively be used for the relative bearing indicator 47.

In a similar but simpler fashion two antennae can be gated to yield a signal that would indicate whether the other aircraft is to the right or left. In addition, a pair of vertically but oppositely directed antennae can be used to indicate whether the aircraft is above, below, or at approximately the same altitude.

*Operation*

The operation has been explained in detail in connection with the detailed description. However, such operation may be quickly recapitulated as follows: When airplane 6 approaches airplane 6a closely enough that their transponding instruments are within range of each other (e.g. 18 miles) both aircraft are transmitting pulses according to a predetermined pattern. For example, each may be transmitting pulses having a length of 2 micro-seconds with a 200 micro-second interval between pulses. When the first of the aircraft (e.g. airplane 6) transmits its next pulse from the oscillator 13 as controlled by the multivibrator 11 through the gate 14 and outward in all directions from the antenna 16 of airplane 6, the signal is received by the antenna 21 of aircraft 6a and passed through its associated mixer 22, amplifier 24, detector 25, to its trigger 26 and then to its multivibrator 11 to initiate a new pulse from its oscillator 13 through gate 14 and amplifier 15 of airplane 6a and this is broadcast in all directions from antenna 16 of airplane 6a. It is likewise received by airplane 6 and a new pulse returned. This process is repeated in rapid sequence and the pulses from multivibrator 11 of each airplane are transmitted to its associated gate 14 to initiate a new pulse and are also transmitted to the range indicator 17. The range indicator 17 is calibrated in miles and shows the distance of the other aircraft.

The amplitude of the pulses transmitted is modulated by variable oscillator 32 as controlled by altimeter 31. This audio frequency modulates the signal emitted and indicates the altitude of the aircraft which is transmitting the signal. The signal received by airplane 6 from airplane 6a is received from antennae 41, 42 and 43 through receiver 20, peak reading AGC 28, band pass filter 33, symmetrical limiter 34 and frequency discriminator 35. At the same time the audio frequency signal which is being transmitted by airplane 6 from antenna 16 is also passed from variable oscillator 32 to symmetrical limiter 36, and the frequency discriminator 37. The difference in frequency of the two signals is proportional to the difference in the outputs of the discriminators 35 and 37 and this difference is read on a voltmeter 38 calibrated in feet of altitude and indicating the differences in altitude of the two aircraft.

The bearing of the airplane 6a with respect to the flight path of the airplane 6 is determined by the three antennae 41, 42 and 43 and is shown on the relative bearing indicator 47.

It will be noted that the range indicator 17 measures directly the pulses emitted by multivibrator 11. However, the multivibrator 11 is controlled by the trigger 26 which is in turn controlled by receiver 20. Therefore the range indicator 17 measures the repetition rate of pulses received by receiver 20 as well as the actuation rate of trigger 26. Because multivibrator 11 controls transmitter 10 as well as range indicator 17, the range indicator 17 measures the repetition rate of pulses transmitted by transmitter 10.

Throughout the specification I have referred to range indicator 17 as measuring the repetition rate of pulses received or transmitted. However, the period between pulses is inversely proportional to the repetition rate and means for measuring such period (by any appropriate method such as for example by a counter-timer) is in effect a measurement of the repetition rate and the term "means for indicating the repetition rate" in the claims is to be construed to include means for measuring the periods between pulses and other similar equivalents.

The trigger 26 is shown and described as a device separate from the receiver 20 employing differentiation and triggering on the offgoing rate of change. Any equivalent method of triggering could be employed or even the multivibrator 11 could be triggered directly from the receiver 20.

It is to be understood that the above described embodiments of my invention are for the purpose of illustration only and various changes may be made therein without departing from the spirit and scope of my invention.

I claim:

1. A pulse return radio system for the prevention of midair aircraft collisions comprising;
   means for repetitively transmitting a series of radio pulses on a prescribed carrier frequency;
   a radio receiver for receiving radio pulses at said prescribed carrier frequency and including a detector;
   trigger means controlled by the receipt of radio pulses, on said prescribed carrier frequency, by said radio receiver, for increasing the rate of transmission of radio pulses by said transmitting means;
   means for measuring the repetition rate of pulses received by the receiver and indicating the distance between the two aircraft; and
   means comprising a peak reading automatic gain control for reading the peak voltage output of the detector and for compensating for slow fading and irregularity in atmospheric propagation.

2. An aircraft anti collision system for preventing a midair aircraft collision between a first aircraft and a second aircraft consisting of a pulse return radio system and comprising;
   a radio pulse transmitter mounted on said first aircraft;
   a radio pulse receiver mounted on said first aricraft;
   a radio pulse transmitter mounted on said second aircraft;
   a radio pulse receiver mounted on said second aircraft;
   means on each aircraft for causing the pulse transmitter thereof to repetitively and periodically emit a radio pulse at a regular rate and normally on a prescribed carrier frequency followed by an inactive period and thus to transmit a series of radio pulses;
   trigger means on each aircraft normally activated by the receipt of radio pulses on said prescribed carrier frequency by the radio pulse receiver of said aircraft to cause the pulse transmitter thereof to emit radio pulses immediately upon the receipt of radio pulses from the other aircraft and for thus increasing the rate of transmission of radio pulses by the transmitter of said aircraft;
   means on each aircraft comprising a range compensating automatic gain control for blanking the receiver thereof during operation of the transmitter thereof, for assuring that the signal at the input of the additional means is of proper amplitude, and for minimizing false triggering;
   whereby the transmitters and receivers of the two aircraft transpond continuously whenever the two aircraft are in range of each other and whenever no other aircraft is nearer to either of said aircraft than the two aircraft are to each other; and
   means on each aircraft for measuring the repetition rate of pulses received by the receiver thereof and for indicating the distance between the two aircraft.

3. The structure of claim 2 in which there is provided in addition on each aircraft;
   electronic means for comparing the characteristics of pulses received with the characteristics of pulses transmitted to indicate the relative altitude of the other aircraft.

4. The structure of claim 2 in which there is provided in addition on at least one aircraft;
   means including a plurality of directional antennae for indicating the bearing of the other aircraft with respect to the flight direction of the said one aircraft.

5. The structure of claim 2 in which there is provided in addition;
   means on each aircraft for coding the pulses transmitted by each aircraft to indicate the altitude thereof;
   electronic means on at least one of said aircraft for comparing the coding of the pulses received with the coding of the pulses transmitted to indicate the relative altitude of the two aircraft; and
   electronic means on at least one of said aircraft including a plurality of directional antennae for indicating the bearing of the other aircraft with respect to the flight direction of the one aircraft.

6. An aircraft anti collision system for the prevention of midair aircraft collisions between a first aircraft and a second aircraft consisting of a pulse return radio system and comprising:
   means on said first aircraft for transmitting repetitively and periodically a series of radio pulses;
   a radio receiver on said first aircraft for receiving radio pulses;
   means on said second aircraft for transmitting repetitively and periodically a series of radio pulses;
   a radio receiver on said second aircraft for receiving radio pulses;
   trigger means on each said aircraft controlled by the receipt of radio pulses by the radio receiver for said aircraft for increasing the rate of transmission of radio pulses by said transmitting means;
   means on each aircraft comprising a range compensating automatic gain control for blanking the receiver thereof during operation of the transmitter thereof, for assuring that the desired signal at the input of the trigger circuit is of proper amplitude and for minimizing false triggering;
   means on each aircraft for coding the pulses transmitted by each aircraft to indicate the altitude thereof;
   means on at least one of said aircraft for measuring the repetition rate of pulses received by the receiver and indicating the distance between the two aircraft; and
   electronic means on at least one of said aircraft for comparing the coding of the pulses received with the coding of the pulses transmitted to indicate the relative altitude of the two aircraft.

7. The structure of claim 6 in which there is a normally free running multivibrator on each aircraft to cause the transmitter to repetitively and periodically emit a radio pulse followed by an inactive period.

8. The structure of claim 6 in which the means on each aircraft for measuring the repetition rate of pulses received and indicating the distance between the two aircraft is a voltmeter.

9. The structure of claim 6 in which there is included in combination;
electronic means including a plurality of directional antennae on the first aircraft for indicating the bearing of the second aircraft with respect to the flight direction of the first aircraft.

10. A pulse return radio system for aircraft comprising a normally free running multivibrator;
means comprising a crystal controlled oscillator, a gate circuit which passes signals from the oscillator only when excited by said multivibrator, a radio frequency amplifier, and a transmitting antenna for transmitting pulses at a regular rate and at a prescribed carrier frequency;
a radio receiver for receiving radio pulses at said prescribed carrier frequency;
trigger circuit means for causing the activation of said multivibrator substantially immediately after the receiving of a pulse on said prescribed carrier frequency by said receiver whereby on recognition of pulses, the transmitter will transmit pulses more frequently than it would without such activation;
means comprising a range compensating automatic gain control for blanking the receiver during operation of the transmitter, for assuring the signal at the input of the trigger circuit is of proper amplitude, and for minimizing false triggering; and
means for measuring the repetition rate of activation of said multivibrator and indicating the distance between the aircraft on which the device is mounted and another aircraft in the vicinity having a similar device.

11. An aircraft proximity warning and anti collision system for preventing a midair aircraft collision between a first aircraft and a second aircraft and for warning the pilots of each aircraft of the approach of the other aircraft and indicating to the pilots the distance between said aircraft consisting of a pulse return radio system and comprising;
a radio pulse transmitter mounted on said first aircraft;
a radio pulse receiver mounted on said first aircraft;
a radio pulse transmitter mounted on said second aircraft;
a radio pulse receiver mounted on said second aircraft;
means on each aircraft for causing the pulse transmitter of said aircraft to repetitively and periodically emit a radio pulse followed by an inactive period and thus emit a series of radio pulses at a regular rate;
means on each aircraft for controlling and varying the characteristics of the radio pulse emitted by the pulse transmitter of said aircraft to cause said pulse to have a characteristic dependent upon the altitude of said aircraft;
trigger circuit means on each aircraft activated by the receipt by the radio pulse receiver of said aircraft, of radio pulses having the characteristics of the pulses being emitted at such time by the pulse transmitter of said aircraft as controlled by the altitude controlling means thereof to cause the pulse transmitter thereof to emit additional radio pulses immediately upon the receipt of radio pulses from the other aircraft when and only when the two aircraft are at substantially the same altitude;
means on each aircraft comprising a range compensating automatic gain control for blanking the pulse receiver of the aircraft during operation of the transmitter of the same aircraft, for assuring that the signal at the input of the additional means is of proper amplitude, and for minimizing false triggering;
whereby the transmitters and receivers transpond continuously when and only when the two aircraft are in range of each other and at substantially the same altitude; and
means for measuring the repetition rate of activation of the pulse transmitters during such transponding and for indicating the distance between the two aircraft.

12. The structure of claim 11:
in which the means for causing the pulse transmitters on said aircraft to repetitively and periodically emit pulses comprises a normally free running multivibrator;
in which the trigger means on each aircraft is activated by and only by the receipt of radio pulses having substantially the same altitude characteristics as the pulses emitted by the transmitter of the aircraft on which said trigger means is mounted, and in which the trigger means changes the period of the said normally free running multivibrator to increase the rate of transmission of radio pulses; and
in which there is also provided electronic means to indicate the bearing of the second aircraft with respect to the flight direction of the first aircraft.

References Cited in the file of this patent

UNITED STATES PATENTS

| 1,945,952 | Nicolson | Feb. 6, 1934 |
| 2,090,359 | Robinson | Aug. 17, 1937 |
| 2,400,309 | Kock | May 14, 1946 |
| 2,485,618 | Mackta | Oct. 25, 1949 |
| 2,486,197 | Newbold | Oct. 25, 1949 |
| 2,495,690 | Bradley | Jan. 31, 1950 |
| 2,498,381 | Smith | Feb. 21, 1950 |
| 2,504,975 | Grieg | Apr. 25, 1950 |
| 2,554,308 | Miller | May 22, 1951 |
| 2,594,916 | Gulnac | Apr. 29, 1952 |
| 2,921,302 | Cartwright | Jan. 12, 1960 |
| 3,019,434 | Bushnell et al. | Jan. 30, 1962 |

FOREIGN PATENTS

| 133,807 | Australia | Aug. 8, 1949 |